Patented June 1, 1954

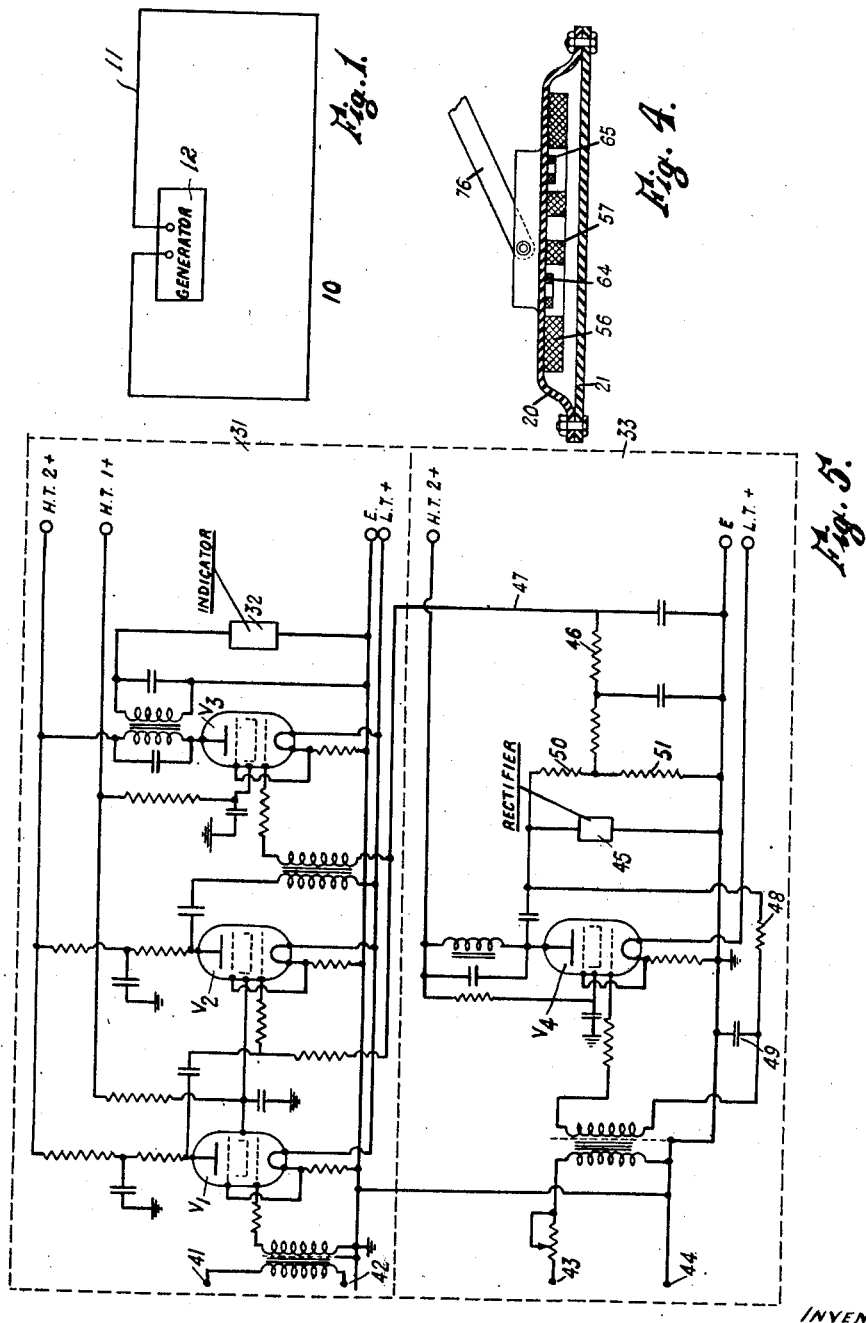

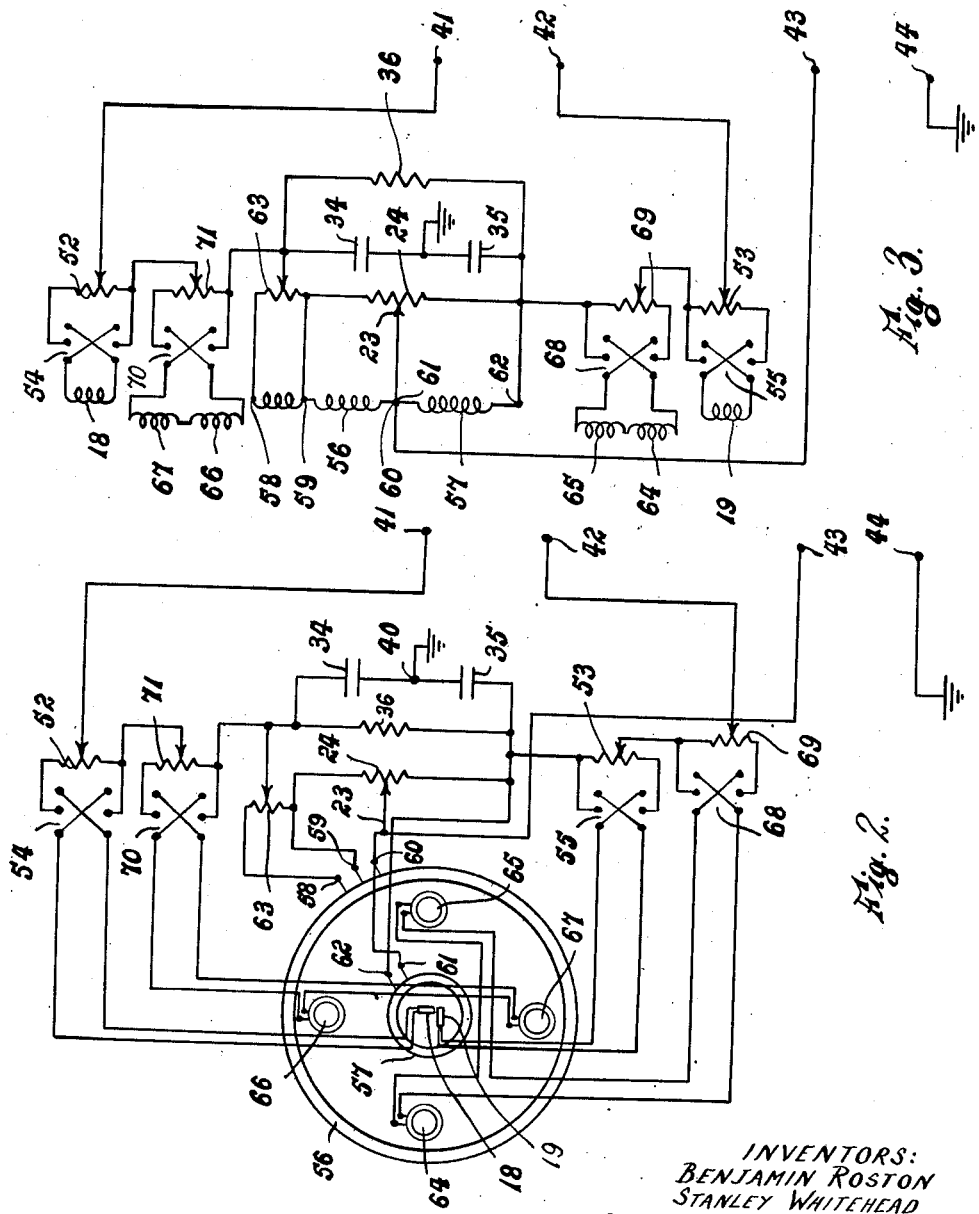

2,680,226

UNITED STATES PATENT OFFICE 2,680,226

LOCATION OF CONDUCTING AND/OR MAGNETIC BODIES

Stanley Whitehead, Leatherhead, and Benjamin Roston, Cheltenham, England, assignors to E. R. A. Patents Limited, Leatherhead, England, a company of Great Britain Original application January 9, 1946, Serial No. 639,986. Divided and this application June 16, 1951, Serial No. 232,014

Claims priority, application Great Britain January 24, 1945

6 Claims. (Cl. 324—3)

The present invention relates to the location of conducting and/or magnetic bodies, and particularly by the use of electro-magnetic means.

It is often desired to find objects which are hidden in a greater or smaller volume in space, often when they are buried or otherwise situated under the surface of the earth. In such a search advantage is generally taken of some property by which the objects differ from their surroundings. When dealing with conducting and/or magnetic bodies, such as ore bodies, pipes, cables, joint or junction boxes, tanks, cisterns and the like, the electro-magnetic method of location may be employed. The principle of this method is to produce an alternating magnetic field over the volume to be searched and to detect the distortion in the field due to the presence of the body to be located by reason of its magnetic permeability and/or the eddy currents induced in it.

The field may be produced only in the immediate vicinity of search or else it may be generated over a larger volume.

In the former application a two-coil locator is generally used, where one coil sets up a local magnetic field while the other serves as the search coil. This type can only be used in locating objects at a small depth below the surface of the ground, since the locator sensitivity is inversely proportional to the sixth power of the distance from the object. In addition interference between adjacent operators may occur unless they are provided with equipment of separate and individual frequencies.

Where sensitivity to objects placed at a greater depth is desired, the magnetic field is generated over a larger volume. One easy way of producing a magnetic field over a large volume is by means of an alternating current passing through a conductor. The return path of the current may either be through the soil or through another conductor. In the latter case a loop is formed which may consist of several turns, and it may be placed either outside the area of search or it may surround a part or the whole of the area.

The problem of location of metallic and/or magnetic objects would under such conditions be simplified if a uniform field could be produced, but this is generally impracticable. For this reason the method hitherto employed in prospecting has been to measure the magnetic field at a number of points by means of one or two search coils. The results are plotted, and from irregularities in the field the presence of searched objects is deduced.

It is the object of the present invention to provide search equipment to make such searches more direct and to enable them to be carried out expeditiously in spite of the use of a non-uniform magnetic field.

Other objects of the invention will be apparent from the following description in conjunction with the accompanying diagrammatic drawings in which Figure 1 shows, by way of example, one arrangement for producing an alternating magnetic field in an area to be searched.

Figures 2, 3 and 4 illustrate a search unit, and

Figure 5 is a circuit diagram of an amplifier and compensator for use with the arrangement of Figures 2, 3 and 4.

Referring to Figure 1 an area 10 to be searched lies outside a loop of cable 11. A single turn loop is shown but two or more turns may be used if desired. By way of example the loop may measure 150 x 300 yards. A generator 12 is connected to feed to the loop an alternating current of a suitable frequency, for example 500 cycles per second. The generator 12 may be of 6 kilowatts. The current in the loop generates in the area 10 an alternating magnetic field which is distorted in the neighbourhood of conducting or magnetic bodies. It will be understood that it may if desired be arranged that the area to be searched is that within the loop.

The search unit shown in Figures 2, 3 and 4 comprises two coils 56 and 57 mounted co-axially, relatively to one another, and coplanar. The coil 56 has three terminals 58, 59 and 60, and the coil 57 has two terminals 61 and 62, the terminals 60 and 61 being connected together. The part of the coil 56 which is between the terminals 58 and 59 serves as a balancing coil the effect of which is adjustable by means of the wiper on a potentiometer 63 connected between the terminals 58 and 59. The number of turns in, and the dimensions of, the coils 56 and 57 are so arranged, according to well known formulae, that the coil 57 and the part of the coil 56 between the terminal 60 and a mid-point between the terminals 58 and 59 have equal area-turns whereby equal and opposite electro-motive forces are induced in them when the unit is placed in a uniform magnetic field.

The unit has two output terminals 41 and 42 for connection to the amplifier of Figure 5 (to be described later) and two further output terminals 43 and 44 for connection to the compensator of Figure 5. Proceeding from the terminal 41 to the terminal 42 through the circuits shown in Figures 2 and 3 the terminal 41 is connected to the wiper of a potentiometer 52. The lower end of the resistance element of the potentiometer 52 is connected to the wiper of a potentiometer 71, and the lower end of the resistance element of the potentiometer 71 is connected to the wiper on the potentiometer 63. From the wiper on the potentiometer 63 the circuit is through the lower part of the resistance element of the potentiometer 63, through that part of the coil 56 which is between the terminals 59 and 60, and through the coil 57 to the upper end of the resistance element of a potentiometer 53. The wiper of this potentiometer is connected to the upper end of the resistance element of a further potentiometer 69 whose wiper is connected to the terminal 42.

Ignoring any potentials which may be developed across the resistance elements of the potentiometers 52, 71, 53 and 69, if the wiper on the potentiometer 63 is set to a position at which the potential between that wiper and the terminal 60, is equal to the potential between the terminals 61 and 62, when the unit is placed in a uniform magnetic field, the potential appearing between the terminals 41 and 42 is zero.

The output at the terminals 41 and 42 is balanced relatively to earth by means of two substantially equal capacitors 34 and 35, a resistor 36 and a potentiometer 24 connected as shown in the drawing. Adjustment of the wiper on the potentiometer 24 also facilitates adjustment of the search unit to provide zero output when the unit is placed in a uniform magnetic field.

Rotation of the search unit about the axis thereof normal to the plane of the coils, that is to say normal to the plane of the paper in Figure 2, may give rise to the appearance of output voltage. This voltage may be reduced considerably by the provision of a number of coils, say four, as shown at 64, 65, 66 and 67 mounted in the same plane as the coils 56 and 57 but arranged eccentrically with respect to the axis of the coils 56 and 57. The eccentric coils 64 and 65 are connected in series and deliver their voltages through a reversing switch 68 to the resistance element of the potentiometer 69. The eccentric coils 66 and 67 are connected in series and deliver their voltages through a reversing switch 70 to the resistance element of the potentiometer 71.

Two compensating coils 18 and 19 are also provided with their axes mutually perpendicular and perpendicular to the axis of the concentric coils 56 and 57. These compensating coils 18 and 19 enable a balance to be maintained between the outputs of the coils 56 and 57 during forward or lateral rotation of the search unit about horizontal axes. The coil 18 is connected through a reversing switch 54 to the resistance element of the potentiometer 52 and the coil 19 is connected through a reversing switch 55 to the resistance element of the potentiometer 53.

In adjusting the unit the reversing switches 54 and 55 and potentiometers 52 and 53 are adjusted until the desired balance is obtained when the unit is given limited rotary movements about horizontal axes. Likewise the reversing switches 68 and 70 and potentiometers 69 and 71 are adjusted until the desired balance is obtained when the unit is rotated about the axis of the coils 56 and 57.

Referring to Figure 4 a housing 20 of insulating, non-magnetic material has an upper part 20 and a cover plate 21 bolted thereto. The search coils 56 and 57 are fixed to the under side of the part 20 by means of any suitable adhesive. Coils 64 and 65 are also shown and are likewise fixed in position by any suitable adhesive.

The potential difference between the terminals 43 and 44 is approximately proportional to the mean magnetic field in the region of the search unit.

Figure 5 is a theoretical circuit diagram of a compensator and amplifier suitable for use with the arrangement of Figures 2, 3 and 4. The voltage appearing between the terminals 41 and 42 of Figure 2 is applied to the amplifier and the voltage appearing between the terminals 43 and 44 is applied to the compensator.

The amplifier comprises three variable-mu amplifying valves $V_1$, $V_2$ and $V_3$ and has input terminals 41 and 42. The compensator comprises a variable-mu amplifying valve $V_4$ and has input terminals 43 and 44. The output of the valve $V_4$ is rectified by a rectifier 45. A part of the rectified output is tapped off from resistors 50 and 51, smoothed in a circuit 46 and applied through a lead 47 as a bias to suitable grids of one or more of the valves of the amplifier 31, in this example to the control grids of the valves $V_2$ and $V_3$. The D. C. voltage developed across the rectifier 45 is also fed back to the control grid of the valve $V_4$ through a smoothing circuit comprising a resistor 48 and condenser 49.

The valve $V_4$ is preferably chosen to have the same characteristics as the valves $V_2$ and $V_3$ of which it controls the amplification so that the relation between the control bias applied through lead 47 and the amplification of the valves $V_2$ and $V_3$ is substantially identical with the same relation in the compensator valve $V_4$. By suitably adjusting the ratio of the D. C. voltage fed back to the grid of the valve $V_4$ to the D. C. voltage applied to the grids of the valves $V_2$ and $V_3$, the amplifier output can be made independent of the mean field strength. Although one form of compensator has been described by way of example, other known or suitable compensating means may be provided.

We claim:

1. Search equipment for use in the presence of an alternating magnetic field for the detection of bodies which distort such a field, said equipment comprising two coils of equal area turns, means for supporting said coils in co-axial and co-planar relationship, an impedance element having two outer terminals and an intermediate terminal between said two outer terminals, one terminal of each of said coils being connected to said intermediate terminal and the other terminal of said coils being connected respectively to said outer terminals, and indicating means for indicating differences of potential between said outer terminals of said impedance element.

2. Search equipment for use in the presence of an alternating magnetic field for the detection of bodies which distort such a field, said equipment comprising two coils of equal area turns, means for supporting said coils in co-axial and co-planar relationship, an impedance element having two outer terminals and an intermediate terminal between said two outer terminals, one terminal of each of said coils being connected to said intermediate terminal and the other terminal of said coils being connected respectively to said outer terminals, a plurality of compensating coils connected to apply compensating electromotive forces in series with said outer terminals, means for supporting said compensating coils in fixed relation to the said two coils, means for adjusting the said compensating electromotive forces, and indicating means for indicating differences of potential between said outer terminals of said impedance element.

3. Search equipment for the location of electrically conducting bodies and magnetic bodies located in an alternating magnetic field, comprising two search coils each having a plurality of turns and the respective products of the mean areas enclosed by the turns of said coils and the numbers of turns respectively in said coils being substantially equal, a mechanical structure for fixedly supporting said coils one within the other in substantially coaxially and co-planar relationship, and means for indicating the difference between the electromotive forces generated by said field in said two search coils.

4. Search equipment as claimed in claim 3, comprising two compensating coils mounted upon said mechanical structure with their axes mutually perpendicular and each perpendicular to the axes of said search coils, connections for applying voltage from said compensated coils to said indicating means, and means for adjusting the electromotive forces generated in said compensating coils to said indicating means for the purpose of balancing.

5. Search equipment as claimed in claim 3, comprising an amplifier, means coupling said amplifier to said search coils, and means coupling said amplifier to said indicating means, said coupling means between said search coils and said amplifier input comprising a balancing circuit including an impedance element having an adjustable intermediate tap, two substantially equal capacitors connected in series between the outer terminals of said impedance element, said search coils being connected to the two outer terminals and the tap of said first impedance element, and the input terminals of said amplifier being connected to the two outer terminals of said first impedance element.

6. Apparatus for the location of electrically conducting bodies and magnetic bodies, comprising means including an electrically conducting loop and alternating current supply means connected to said loop for producing an alternating magnetic field of substantial strength over a large area, and search apparatus for searching over the area, the search apparatus being movable relatively to said loop and including two coils of equal area turns, means for supporting said coils in co-axial and co-planar relationship, an impedance element having two outer terminals and an intermediate terminal between said two outer terminals, one terminal of each of said coils being connected to said intermediate terminal and the other terminal of said coils being connected respectively to said outer terminals, a plurality of compensating coils connected to apply compensating electromotive forces in series with said outer terminals, means for supporting said compensating coils in fixed relation to the said two coils, means for adjusting the said compensating electromotive forces, and indicating means for indicating differences of potential between said outer terminals of said impedance element.

References Cited in the file of this patent

UNITED STATES PATENTS

| Number | Name | Date |
|---|---|---|
| 1,812,392 | Zuschlag | June 20, 1931 |
| 2,124,577 | Knerr | July 26, 1938 |
| 2,337,352 | Sitterson et al. | Dec. 21, 1943 |
| 2,513,745 | Reynolds | July 4, 1950 |
| 2,557,994 | Ostlund | June 26, 1951 |